United States Patent Office 3,785,930
Patented Jan. 15, 1974

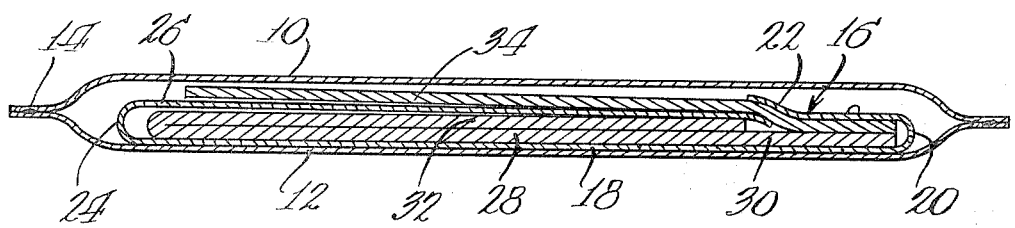
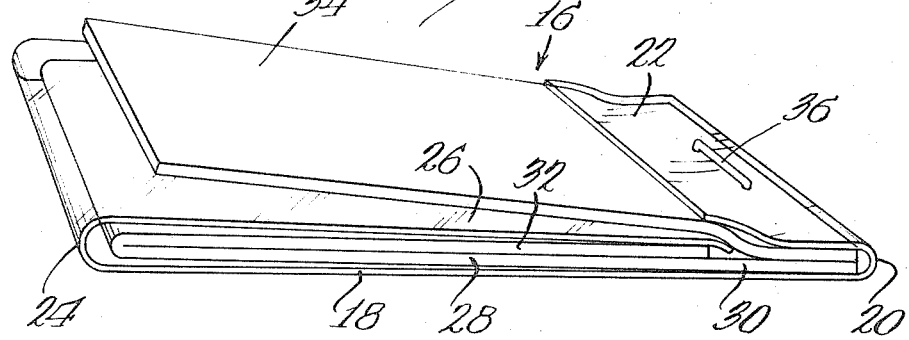
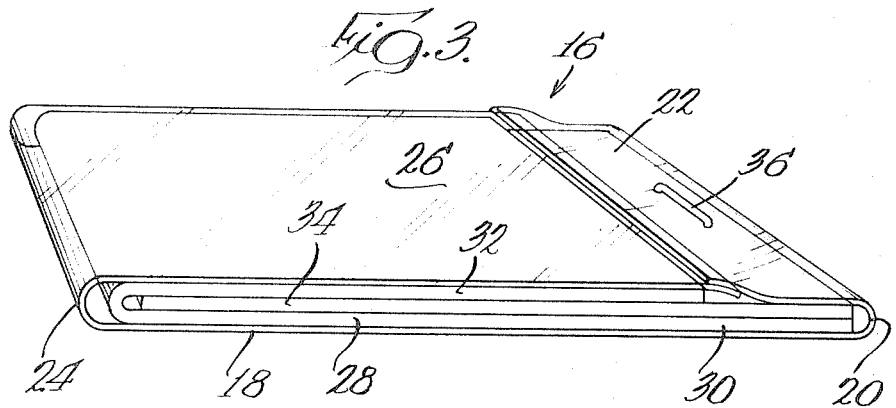

3,785,930
MICROBIOLOGICAL ACTIVITY TESTING DEVICE
R. James Ellis, Fort Wayne, Ind., assignor to
Peter Eckrich and Sons, Inc.
Filed Dec. 22, 1971, Ser. No. 210,945
Int. Cl. C12k 1/10
U.S. Cl. 195—127                    10 Claims

ABSTRACT OF THE DISCLOSURE

A device for determining microbiological activity in meats. A simple, economical and disposable testing device is provided by a folded-over transparent sheet to which is secured a sheet of a resazurin dye-containing material. A sample is brought, directly or indirectly, into contact with the sheet of dye-containing material and thereafter the transparent sheet is folded over the same to preclude moisture loss during incubation. Color change may be readily observed through the transparent sheet and the time required for color change taken as a measure of the microbiological activity in the meat.

BACKGROUND OF THE INVENTION

This invention relates to disposable testing devices, and, more particularly, to microbiological activity testing devices for use by the meat packing industry.

There has long been a need for an easily conducted, relatively rapid testing procedure whereby a rough judge of the microbiological activity in meat may be obtained so as to prevent the use of poor quality meat in the production of various types of meat products. It has been suggested that this need can be met by resazurin dye reduction tests wherein a sample is contacted with a solution of resazurin dye and the color change timed. High microbiological counts increase the speed of reduction of the dye and thus, the measure of time required for the color change is a measure of the microbiological activity.

As initially practiced, the method employed involved the wiping of a cotton swab over the surface of the meat to be tested. Thereafter, the cotton swab was immersed in a dye solution and the color change timed. This procedure required a great deal of manipulation in that when large numbers of samples were to be examined, a significant time was required in making up test tubes containing the dye and manipulating the swabs. And, of course, substantial time was required for clean-up following the conducting of the tests.

More recently it has been suggested that filter paper strips impregnated with a resazurin solution be placed in a bag with the meat sample, the bag inverted to contact the strips for a predetermined period of time, whereupon the strips are removed from the bag and incubated and the time for color change noted. Again, this procedure requires substantial manipulation and is unacceptable from this standpoint alone. Moreover, since a meat sample is actually contacted with dye-containing strips, the meat must be discarded and cannot be put into production. Thus, the testing of a dressed out carcass or a primal cut causes substantial waste.

SUMMARY OF THE INVENTION

It is the principal object of the invention to provide a new and improved testing device for testing microbiological activity or performing similar tests. More particularly, it is an object of the invention to provide such a testing device which is easily used, inexpensive and which may be disposed of after use to minimize clean-up problems; and further which can be used in such a way that an edible sample to be tested, such as meat, can nonetheless be used in production.

The exemplary embodiment of the invention achieves the foregoing objects in a construction including a folded-over transparent plastic sheet having a sheet of reagent-impregnated, fibrous material secured thereto within the fold. The transparent sheet prevents moisture loss during incubation in that it can be folded over the reagent-containing sheet and further protects the reagent-containing sheet from contact with the hands of the user or the like. Moreover, because of its transparent nature, color change of the reagent can be observed through the transparent sheet itself.

In a preferred form of the invention, the reagent-containing sheet is also folded over and the assemblage is provided with a sterile, sample-contacting or transfer sheet which may be disposed exteriorly of the transparent sheet during sampling and thereafter located within both the transparent sheet and the folded-over, reagent-containing sheet to transfer the sample to the reagent-containing sheet whereby the reagent-containing sheet need not contact the material being sampled. As a result, the sample need not be disposed of, but may be used in production. The exemplary embodiment also contemplates the provision of a moisture and light-proof, sealed package containing the testing device. When such is used, the sample-containing device may be pre-moistened to eliminate a moistening step by the user thereof.

Other objects and advantages of the invention will become apparent from the following specification taken in conjunction with the accompanying drawings.

DESCRIPTION OF THE DRAWINGS

FIG. 1 is a vertical section of a package containing a sampling device made according to the invention;

FIG. 2 is a perspective view of a sampling device with its various elements oriented with respect to each other for sampling; and FIG. 3 is a perspective view of a sampling device with its various elements oriented with respect to each other in a reaction position.

DESCRIPTION OF THE PREFERRED EMBODIMENT

FIG. 1 illustrates the preferred embodiment of the invention within a sealed packet. The packet may be formed of two sheets 10 and 12 formed of material such as foil and peripherally sealed as at 14 to completely encapsulate the sampling device, generally designated 16. While materials other than foil can be used for the sheets 10 and 12, it is preferable that they be impermeable to moisture, microbial or chemical agents and are opaque so as to preclude the passage of light to the testing device 16.

Turning now to FIG. 2, the testing device 16 is defined by a folded-over transparent sheet 18 formed of plastic or the like. The sheet 18 is configured in the same form as a matchbook cover, being folded as at 20 at one end to define a short flap 22 and being folded as at 24 to define a long flap 26 which may be nested under the short flap 22 as illustrated. Within the resulting structure there is located a folded-over reagent-containing sheet 28 of fibrous material. The sheet 28 may be formed of any suitable fibrous material such as filter paper or a fabric such as cottom muslin. The same includes a long side 30 terminating adjacent the fold 20 and a short side 32 terminating adjacent the end of the long flap 26.

The device is completed by a sampling or transfer sheet 34 having one end located within the fold 20 and its other end terminating short of the fold 24. The three sheets are secured together adjacent the fold 20 by a staple 36 or the like. The sheet 34 is also formed of a fibrous material and is in a sterile condition. While the same may be formed of material such as filter paper, as will become more apparent hereinafter, it is desirable that the sheet 34 have substantial wet strength and to this end, it is preferably formed of a fabric such as cotton muslin.

The sampling device 16 is normally packaged with the elements oriented with respect to each other as illustrated in FIG. 2 so as to preclude the sterile sheet 34 from contacting the reagent-containing sheet 28. In use, the package is opened and the sheet 34 brought into contact with the sample such as a ground meat sample or a carcass or a primal cut. Contact may be maintained for, for example, thirty seconds or, in the alternative, the sheet 34 may be wiped across the surface of the meat. If the sheet 34 may be wiped across the surface of the meat. If the sheet 34 is brought in contact with the sample by a wiping action, it is desirable that the same be formed to have substantial wet strength as mentioned previously.

After the sterile sheet 34 has been brought into contact with the sample, the long flap 26 is moved out from its underlying relation with the short flap 22 to open the assemblage including the short side 32 of the reagent-containing sheet 28 so that the transfer sheet 34 may be located between the two sides 30 and 32 of the reagent-containing sheet. Thereafter, the long flap 26 is again inserted under the short flap 22 so that the device assumes a configuration illustrated in FIG. 3. As a result, the sample will be transferred via the transfer sheet 34 to the reagent-containing sheet to initiate the test reaction. The reaction may then be timed and color change observed through the transparent sheet. In this regard, the transparent sheet serves the further function of precluding moisture loss during incubation. Similarly, during the manipulation portions of the sampling process, the transparent sheet 18 precludes the user from contacting either the transfer sheet 34 or the reagent-containing sheet 28.

As alluded to previously, the use of resazurin dye as the reagent is preferred. According to the preferred embodiment, the reagent-containing sheet is impregnated with a 0.011% solution of resazurin dye and is normally packaged in this moistened state. Optionally, however, the same may be dry and wetted with sterile water prior to the sampling operation. Similarly, the sampling strip can be packaged in a moist condition or may be moistened with water prior to the sampling procedure. Preferably, at least the reagent-containing strip is premoistened so that the dye concentration can be closely controlled for reproducability of results. If both strips are premoistened, a moisture barrier, such as paraffin, should be placed at their interface within the short flap 22 to prevent the reagent from leaching into the sampling strip.

Normally, when the color changes to pink or red in less than ten minutes, the indication is that the meat quality is unacceptable. If the change requires ten to thirty minutes, the meat will be in a just acceptable category while good quality is indicated when the color change requires between thirty and sixty minutes. Excellent quality is indicated when the color change requires more than an hour.

It will be recognized that where, for any reason, as, for example, governmental regulations regarding packing operations, it is undesirable to contact the sample directly with a dye-containing strip, the use of the intermediate or transfer strip 34 allows such to be done. This can often be of substantial benefit where such contact would be precluded by governmental regulations and would therefore require the discarding of the sample after use. For example, were a primal cut or a carcass to be tested without such an intermediate strip, such regulations would require the excision of that portion of the carcass or the cut contacted by a dye-containing strip before such meat could be used in production. Obviously, such a waste would be undesirable. On the other hand, where such contact is not of concern, the transfer strip 34 may be eliminated and, if desired, one of the legs of the dye-containing strip 28 as well. However, it is desirable to retain at least a folded-over transparent strip so as to preclude moisture loss during the incubation period.

I claim:

1. A disposable microbiological activity testing device comprising: a transparent, folded sheet of plastic and a fibrous pad secured thereto within the fold, said pad containing a reagent of the type that changes color in response to contact with microorganisms, said sheet of plastic being arranged in a matchbook cover configuration to define a short flap and a long flap, said long flap being receivable under said short flap to substantially confine said fibrous pad within the fold to preculde moisture loss after said fibrous pad has contacted a sample to be tested for microorganisms, a change in color in said reagent being visible externally of said testing device by reason of the transparent nature of said folded sheet of plastic.

2. The testing device of claim 1 further including a surrounding package, said package being formed of a material that will preclude the passage of moisture, light, microbial and chemical agents to said pad.

3. The testing device of claim 2 wherein said pad is moistened.

4. A microbiological activity testing device comprising: a doubled over sheet of transparent material; a doubled over sheet of fibrous material secured within said transparent sheet, said sheet of fibrous material being impregnated with a microbial activated, color changing reagent; and a sterile pad of fibrous material secured at one end to one of said transparent sheet and said fibrous sheet, said sterile pad being adapted to be brought into contact with a sample and thereafter located within the fold of said fibrous sheet to bring the latter into contact with a sample without actually contacting the sample with the fibrous sheet itself thereby precluding contact of the reagent with the material to be sampled.

5. A sampling device according to claim 4 wherein said reagent is resazurin.

6. A moisture and light impervious package containing a sampling device according to claim 4.

7. The packaged sampling device of claim 6 wherein both said sterile sheet and said fibrous pad are moistened.

8. A microbiological activity testing device for providing a measure of the microbiological activity in meat comprising: a transparent sheet arranged in a matchbook cover configuration to define a short flap and a long flap; a folded-over pad of fibrous material having one end secured to said transparent sheet adjacent said short flap and the other end free to move away from said short flap, said fibrous pad being impregnated with resazurin; and a sterile fibrous sheet secured to said transparent sheet within said short flap and having an end extending therefrom and adapted to be located exteriorly of and in overlapping relationship with said long flap to be brought in contact with a meat sample and thereafter located within said long flap and said folded-over fibrous pad.

9. The testing device of claim 8 wherein said sterile sheet is formed of a fabric.

10. The testing device of claim 8 wherein said sterile sheet is formed of a fabric and a single securing means secures both said fibrous sheet and said sterile sheet to said transparent sheet.

References Cited

UNITED STATES PATENTS

| | | | |
|---|---|---|---|
| 2,029,245 | 1/1936 | Lyon | 260—Dig. 20 |
| 1,238,123 | 8/1917 | Freeman | 23—253 TP |
| 3,232,710 | 2/1966 | Rieckmann et al. | 195—103.5 R |

A. LOUIS MONACELL, Primary Examiner

ROBERT J. WARDEN, Assistant Examiner

U.S. Cl. X.R.

23—253 TP; 195—103.5 R, 139; 260—47 R, Dig. 20